Patented July 21, 1931

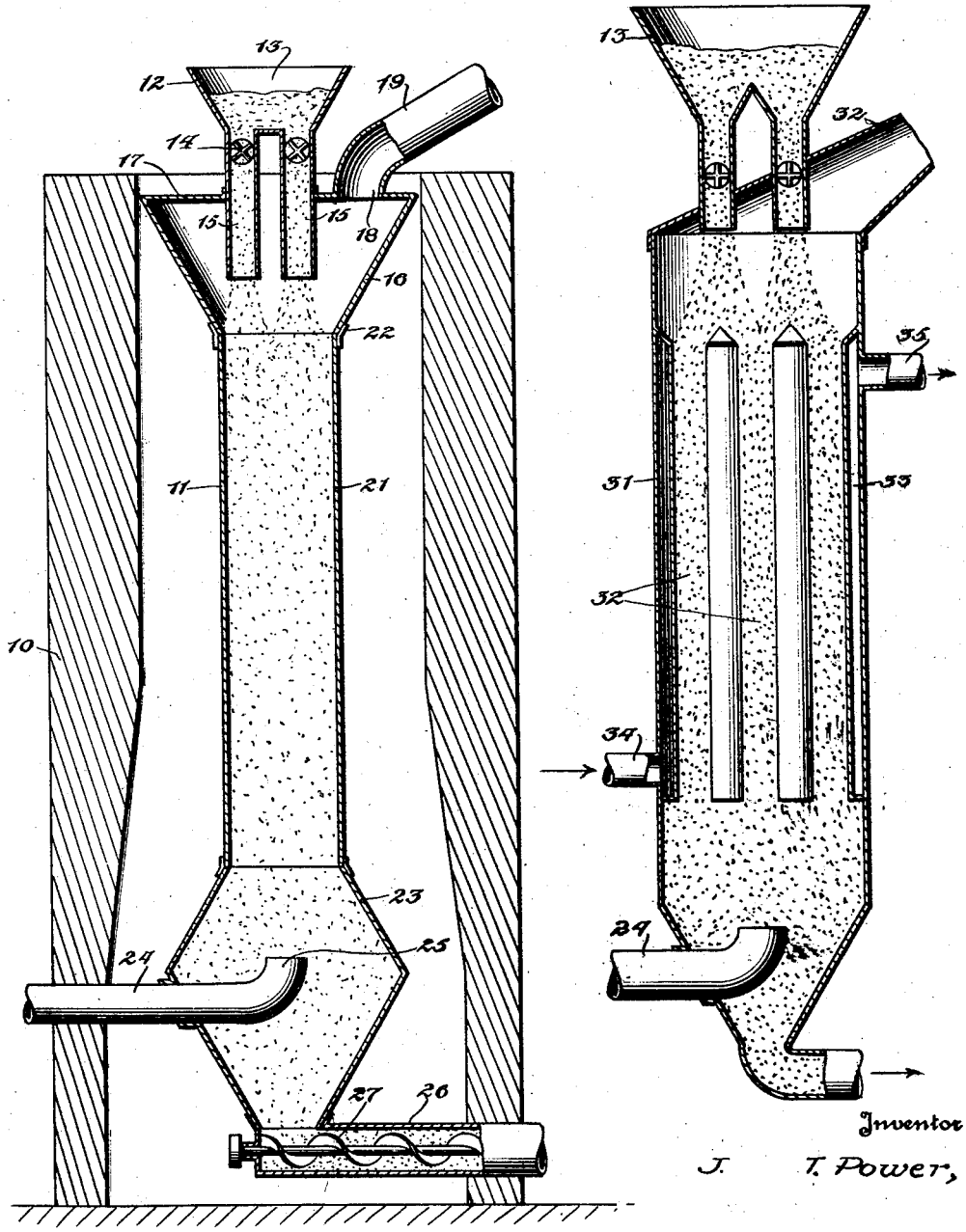

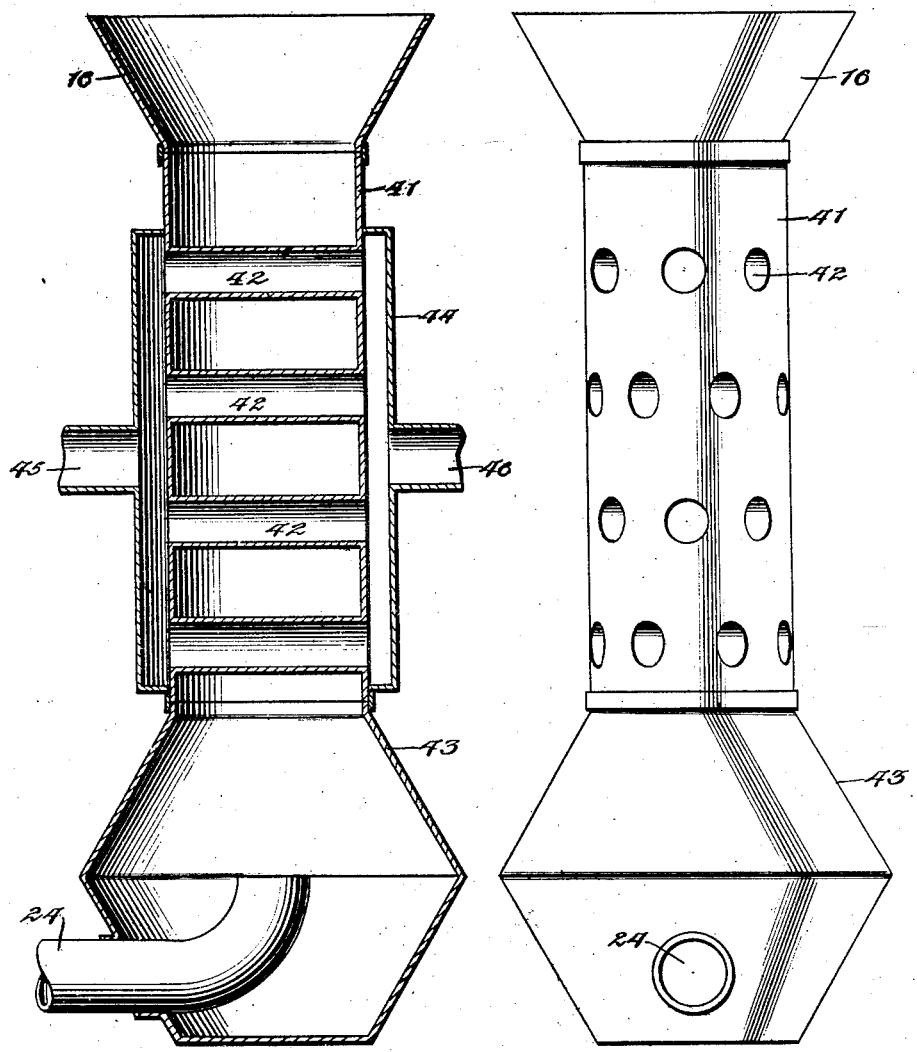

1,815,525

UNITED STATES PATENT OFFICE

JAMES T. POWER, OF WILMINGTON, DELAWARE, ASSIGNOR TO DARCO CORPORATION, OF WILMINGTON, DELAWARE, A CORPORATION OF DELAWARE

ACTIVATING CARBON

Application filed April 18, 1927. Serial No. 184,611.

This invention relates to activating carbon; and it comprises a process of activating carbon and reactivating exhausted carbon wherein carbon in fine form is allowed to fall through an upward uniformly moving current of hot gases containing a mild oxident ($CO_2$ or $H_2O$), the falling movement being substantially retarded by said current and the time of fall increased, the speed of current, the supply of heat units at a temperature of 800°–900° C. and the composition of the hot gases being so correlated as to effect activation during the period of such fall; all as more fully hereinafter set forth and as claimed.

Activation of carbon in making decolorizing carbon is essentially a cleaning out action; the pore surfaces are freed of inactive matter and rendered clean and active. The operation requires an exact control of conditions to secure the highest efficiency. In activation, heat alone is not sufficient; there must be oxidation as well, but the oxidation must be limited to the exact extent required. Air alone is not found suitable for oxidation since high temperatures develop with free access of air and the action is found to be too far going; the material simply burns. It is usual to employ "mild oxidents" such as carbon dioxid, chlorine, or steam, which are efficient agents in producing the restrained type of oxidation required, as their action is highly endothermic and oxidation can go forward only to the extent that heat units are supplied from some source.

Oxidation with carbon dioxid for example can go forward as long as the temperature plane is above 800–900° C. and heat units are available at or above that temperature. But the absorption of heat tends to drop the temperature to a point where action ceases, namely below the 800–900° C. plane. The oxidizing action is therefore self regulating and can be controlled by controlling the heat supply; the amount of oxidation which can be effected by products of combustion is proportional to the quantity of heat which can be supplied to the system at a temperature above 800–900° C. With steam, the relations are similar.

Control of the supply of heat however is difficult in the usual externally heated retorts; it not being easy to transfer heat to and through a granular material against an endothermic action. Naturally the walls are hotter than the axis. Instead of using retorts, a balanced draft of air and steam or of air and products of combustion can be sent through a mass of carbon following the lines of gas producer practice, and this is sometimes done. However with masses of carbon the action is not smooth or exact and moreover the operation presents some other difficulties. The time factor in activating is important; it is necessary to effect a mild oxidation of each individual granule and yet have this mild oxidation reach all the interior surfaces. This is not easy to secure with draft currents penetrating a pervious mass of granular material.

In the present invention I have striven to overcome the difficulties attendant on reactivation and provide a process wherein an accurate and controlled oxidation can be effected. To this end, I effect individual activation of the carbon particles, so to speak, each being individually suspended in a body of hot gases during such time as may be necessary. In practical embodiments of my process, either finely ground new material to be activated, or spent carbon to be reactivated, is dropped in retarded fall through a comparatively large volume of hot gases of adjusted composition flowing upward at such a rate as to produce the required retardation of fall, the upward flow being uniform at all points in any given horizontal plane. The time of treatment is determined by the vertical velocity of the gas. By correlating temperature conditions with length and time of fall and with the composition of the gaseous draft current, it is possible to effect the correct amount of cleaning out in the time occupied by the particle of carbon in falling. The heat units necessary to compensate for endothermic action may be supplied wholly by the sensible heat of the draft current in cases where not much cleaning out is required or this sensible heat may be supplemented by the exothermic action of a little air in the draft current. So doing, I make available for activation the sensible heat of the activating gas corresponding to the excess of the initial temperature of this gas over the temperature required for activation. Outside heat may also be used. Since the mass to be heated in the present invention is virtually a gas mass containing suspended isolated solids heat transfer to the individual particles is uniform and the gas mass as a whole can be efficiently and uniformly heated by external heat. However, in many cases to secure all the cleaning out that is necessary, external heat is not required.

In the accompanying illustrations,

Fig. 1 is a vertical cross-sectional view of an apparatus that may be employed in the process;

Fig. 2 is a vertical cross-section of another type of apparatus;

Fig. 3 is a vertical cross-section of another form of apparatus for treating carbon; and, Fig. 4 is a side elevation of the apparatus shown in Fig. 3.

The apparatus shown in Fig. 1 comprises a housing 10 which may be brickwork and which encloses a vertical retort indicated generally by the reference numeral 11. A feeding device or hopper 12, by which material to be treated is introduced to the retort, is disposed above the housing 10 and projects downwardly into the retort 11. The hopper 12 is provided with a conical portion 13 adapted to receive material from a suitable source of supply, (not shown), and with feeding devices 14, such, for example, as rotating cups which may be operated to introduce predetermined quantities of material at a uniform rate to the retort 11. Downwardly projecting tubes 15, forming a part of the feeding mechanism, direct the material discharged from the cups 14 within the retort.

The upper portion 16 of the retort 11 is of conical configuration to serve as a settling chamber and is provided with a cover 17 in which is formed an aperture 18 permitting the escape of waste gases through a conduit 19. The flare or taper of the upper portion 16 of the retort serves to increase the cross-section at the upper end and locally decreases the speed of the upward flowing activating gases, just prior to their escape from their retort, which obviates dust losses.

The mid-portion 21 of the retort 11 consists of an elongated tubular member joined to the conical portion 16 by suitable means such as a reinforcing web 22. Member 21 is made of such length that the particles of carbon are retained therewithin for an appreciable time; a definite and substantial time being required for any given particle to fall from the upper end of the tubular portion 21 to the lower extremity thereof. This portion, 21, of the retort being cylindrical, a uniform upward flow of gases therethrough is possible; the vertical component of the velocity of the gas at any point in a given horizontal plane being substantially the same as at any other point in the same plane. The vertical velocity of the gas is less than the velocity at which a particle of carbon in the same plane would fall through the same gas were the gas stationary. The carbon falls, but the fall is retarded.

Secured to the lower portion of the member 21, and registering therewith, is a conical member 23 flaring outwardly for a portion of its length and then tapering inwardly. In the flaring portion 23 there is a less upward speed of gas than in the cylindrical portion 21 surmounting it. Pipe 24, projecting through the housing 10 and the member 23, terminates in an upwardly turned portion 25, disposed in substantially concentric relation with the tube 21. The pipe 24 is employed to introduce hot activating gases to the retort from a suitable external source, not shown. These gases may be hot flue gases which ordinarily carry a little excess air. Hot neutral or reducing gases may be used; or further air may be added as circumstances may dictate. Sometimes superheated steam, with or without added air, is used. Mixtures of steam and flue gases may be used. Products of combustion from gas flames however usually carry as much water vapor as is necessary. A discharge mechanism is attached to the lower extremity of the member 23 for the purpose of removing treated and reactivated material. As illustrated, this mechanism comprises a longitudinally disposed tube 26 in which is positioned a rotatable screw conveyor 27.

In operating with this type of furnace, all of the heat absorbed in activation may be introduced as sensible heat of the activating gases introduced into the chamber through pipe 24. Spent carbon, or other material to be activated or reactivated, is fed into the upper portion 16 of the retort and falls downwardly under the influence of gravity. At the same time, activating gases flow upwardly via orifice 25 of the pipe 24, and, by the buoying force they exert, retard the fall of the particles of material introduced from the hopper 12. The time during which the carbon is in contact with the activating gases depends upon the rate of upward flow of the gases, the time being inversely proportional to the rate of flow, and the supply of heat also depends upon the rate of gas flow, being directly proportional to this and to the temperature of the entering gases. The rate of gas flow can be in inverse ratio to the temperature of the entering gas. The velocity of the gas flow is then so adjusted with respect to the height of the mid-portion 21 and the temperature of the gas entering through pipe 21 that a sufficient time elapses during the retarded fall of the particles to give proper activation.

It is to be understood that proper activation consists in cleaning the material to a point where the impurities are removed, without, however, charring or burning in a manner which would decrease efficiency and give an undue loss in weight. Proper procedure necessitates a correlation of the size of the particles, the quantity of particles introduced, the amount of cleaning and activation required, the length of the retort, the velocity, and the temperature of the activating gases. The particles should be fed at such a rate that they can scatter themselves within the chamber 21, thus providing a relatively large space between adjacent particles which can be occupied by activating gases. The formation of clouds or bodies of carbon of appreciable density is to be avoided. When operating in the manner proposed, each particle of carbon is surrounded by an atmosphere of hot activating gases, and hence, each particle can be reactivated as a unit without reference to adjacent particles.

At the same time, each particle falls through the retort with a velocity which is less than that which would be imparted by the force of gravity acting alone. The retardation is accomplished by the counterbalancing influence of the force exerted by the upwardly flowing gases. While the particles fall at a retarded rate the time of passage of each particle through the cylindrical portion 21 of the retort is substantially the same. The action is not one wherein a portion of the material falls rapidly while another portion is blown upwardly and retained within the retort for a greater length of time. A jet of activating gases producing a localized high velocity stream forcing the carbon particles upwardly is to be avoided. It is advantageous to send the activating gases through the retort 21 so that there is an equal upward flow at any point in any transverse plane. For example, gases emerging through the pipe 24 expand into the section 23 and so adjust themselves to substantial uniformity of pressure across the entrance to the portion 21 as they enter into contact with carbon to be treated. In this way of operating, the carbon particles falling in any vertical path meet with the same retardation, and hence are exposed to the gases for equal periods of time. Essentially, the operation consists in separating each of the particles, enclosing it in its own activating atmosphere, and yet providing for the particles substantially equal times of exposure.

The apparatus shown in Fig. 2 may be employed in the same process, but it is particularly suitable when it is desired to apply an external source of heat to and in furnishing the heat units consumed by the endothermic reactions within the retort. The apparatus consists of a cylindrical member 31, to the upper portion of which is attached a hopper 13, identical in its construction and operation with the hopper shown in Fig. 1. A discharge tube 32 is provided at the upper end of the retort to permit of the removal of activating gas, and an inlet pipe 24 projects through the lower portion of the apparatus. The operative portion of the apparatus 31 is formed of a plurality of parallel tubes 32 through which the treated material falls. Surrounding tubes 32 and within the member 31 is a heating shell 33 provided with an inlet pipe 34 at its lower end and an outlet pipe 35 at its upper end. In operation, hot gases, introduced through the pipe 34, circulate around the tubes 32 to supply heat units to the charge. Waste gases escape through the pipe 35. In other respects the operation of the furnace is similar to that described in connection with Fig. 1. The particles of carbon fall through the individual tubes 32, wherein they are widely spaced and are subjected to the activating influences of a suitable atmosphere introduced through the pipe 24. The fall of the particles is retarded in the manner described above. Where wall heating is to be used, there is less likelihood of localized drops in temperature along the axis of the tubes 32, since they are of considerably less diameter than the member 21, and give better distribution of heat.

The apparatus shown in Figs. 3 and 4 is analogous in principle to that shown in Fig. 2 but differs therefrom substantially in the location of the tubes. The apparatus is provided with a conical upper portion 16 which merges into a vertically disposed tower 41. A plurality of tubes 42 are disposed transversely of the tower 41 and serve to conduct externally supplied heating gases to the material treated. Carbon falling through the tower 41 passes on either side of the tubes 42, and is discharged into a flared chamber 43 similar to the part 23 illustrated in Fig. 1. A jacket 44, provided with an inlet pipe 45 and an outlet pipe 46, is positioned around the tower 41 and the tubes 42 for the purpose of introducing heat. The operation of the process for this type of apparatus is substantially the same as that previously described.

The hot gases introduced through the pipe 24 are of the character described and contain mild oxidants, such as carbon dioxid, steam, or mixtures thereof. They should be at such a temperature and in such ample proportion to the quantity of carbon treated, as to supply a substantial amount of heat units at temperatures above 800° to 900° C. This temperature value permits the desired activating reactions, but prevents the overheating of the carbon in a manner which would injure it. If external heating is also employed, the temperature of the hot gas is varied to maintain the same heat balance. In all cases, the velocity of the activating gases must be regulated to retain the carbon within the retort for a necessary length of time to yield the retarded fall desired. The velocity of exit of waste gases however should not be so great as to blow the fine particles out of the top of the apparatus. It will be observed that in all cases the flow of activating gas is countercurrent to the direction of fall of the material treated.

In practice, it is sometimes advantageous to employ two or more retorts, and to subject the carbon to successive treatments in them. In a two stage process, raw material is partially treated by means of the waste gases coming from the second retort, to reduce the load on the second stage and to effect economies in operation. The carbon treated in the first retort is then passed through the second retort in the manner indicated. A two stage process is advantageous when preparing a new activated carbon, but a single stage process is often satisfactory for revivification of spent carbons.

A convenient source for mild oxidants, such as a mixture of $CO_2$ and steam, is furnished by burning methane gas. The combustion gases are at a relatively high temperature, and may be in excess of 2000° C. if the methane is preheated, as, for example, by conducting it past the reactivated carbon discharged at the bottom of the retort. At these temperatures, the walls of the retort tend to become incandescent, and to assist in reactivation by radiating heat to the central portion of the activating chamber. A temperature of incandescence is about that required for satisfactory reactivation, (800–900° C.) and hence this heating of the retort walls by the activating gases aids the maintenance of a heat balance, rather than destroying it.

What I claim is:

1. The process of activating carbon which comprises feeding finely divided and dispersed carbon particles continuously into the top of an upwardly flowing column of hot gases containing $CO_2$ and $H_2O$, said gases being preheated to a temperature substantially above 900° C. and the vertical upward velocity of the gases being great enough to retard but not great enough to prevent the fall of said particles through the gases, so adjusting the rate of flow of the gases and the rate of feed of the carbon in correlation with the height of the column and the preheat of the gases as to afford time for substantially complete activation of the carbon particles in their fall through the gases and removing the activated carbon from the bottom of said gas column.

2. The process of activating carbon which comprises feeding finely divided and dispersed carbon particles continuously into the top of an upwardly flowing column of hot gases constituting the products of hydrocarbon combustion, said products being at a temperature substantially above 900° C. and the vertical upward velocity of the gases being great enough to retard but not great enough to prevent the fall of said particles through the gases, adjusting the rate of flow of the gases, their initial temperature and the rate of carbon feed to effect substantially complete activation of the carbon particles during their fall through the gases and removing the activated carbon from the bottom of said gas column.

3. In the activation of carbon by allowing it to fall in finely divided and dispersed particles through an upwardly flowing column of activating gases, the improvement which comprises preheating the gases to a temperature substantially above the activating temperature and so adjusting the time of contact between the carbon particles and the gases by regulation of the rate of upward flow of the gases that the particles are activated during their fall at expense of heat carried in the activating gases.

In testimony whereof, I have hereunto affixed my signature.

JAMES T. POWER.